Jan. 14, 1936.  F. J. RODIN  2,027,840
POTATO HARVESTER MACHINE
Filed March 4, 1935   5 Sheets-Sheet 2

INVENTOR
Fritz Joakim Rodin

Jan. 14, 1936.  F. J. RODIN  2,027,840
POTATO HARVESTER MACHINE
Filed March 4, 1935  5 Sheets-Sheet 5

INVENTOR
Fritz Joakim Rodin

Patented Jan. 14, 1936

2,027,840

UNITED STATES PATENT OFFICE 2,027,840

POTATO HARVESTER MACHINE

Fritz Joakim Rodin, Chatham Center, N. Y.

Application March 4, 1935, Serial No. 9,251

4 Claims. (Cl. 55—51)

This invention relates to a potato harvester machine for digging, grading and conveying the potatoes into sacks or the like.

An improvement object is the provision of an elevator for separating the vines from the potatoes and for means by agitators to give same a shaking action up and down for the purpose of removing the potatoes adhering to the vines.

Another object is a blower for removing leaves, grass and small parts of vines that otherwise would have to be picked out by hand.

A further object is a grader for grading the potatoes to U. S. standard No. 1 and No. 2 grades.

Another object is the provision of rotating knives for the purpose of cutting off vines and weeds that cling on the side in front of the digger.

With the above and other objects and advantages in view the invention consists in arrangement of parts to be more fully described and claimed and illustrated in the accompanying drawings in which:—

Fig. 7 is a plan view of the grading elevator links showing how same are made and hooked together.

Fig. 8 is a plan view of a cross rod from elevator sorting out the vines to show how the same is bent to form a hook for catching the vines. A few links from the chain 5 are shown on this rod.

Referring more particularly to the drawings, the device 1 consists of a shovel secured to the front end of one pair of beams 2. The beams of each are arranged in parallel spaced relation resting on a pair of supporters which in turn is secured to the axle.

Positioned between the beams 2 and side cheeks 17 is an elevator for shaking the potatoes from the vines and for conveying the weeds and vines to the ground in the rear of the machine.

Figure 1:
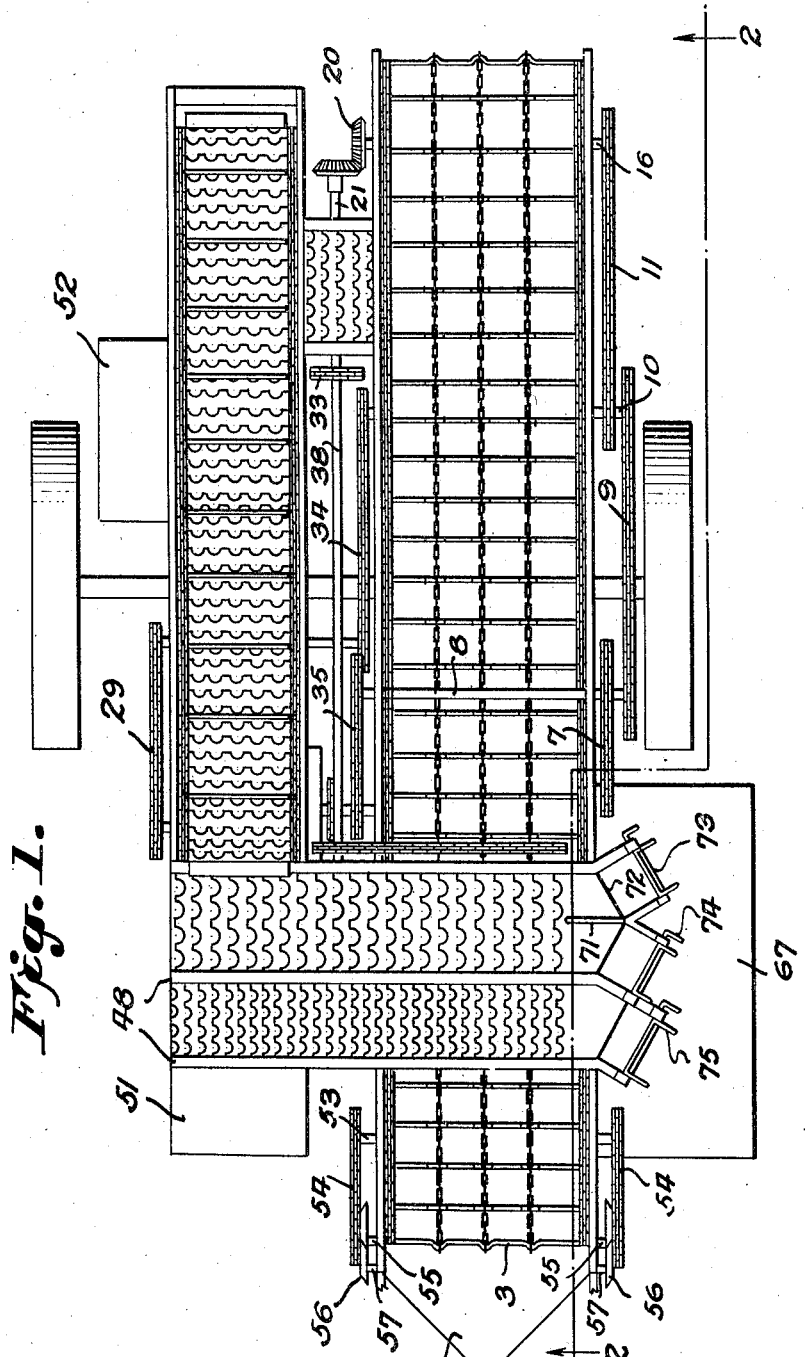
Fig. 1 is a plan view of the device.
Figure 2:
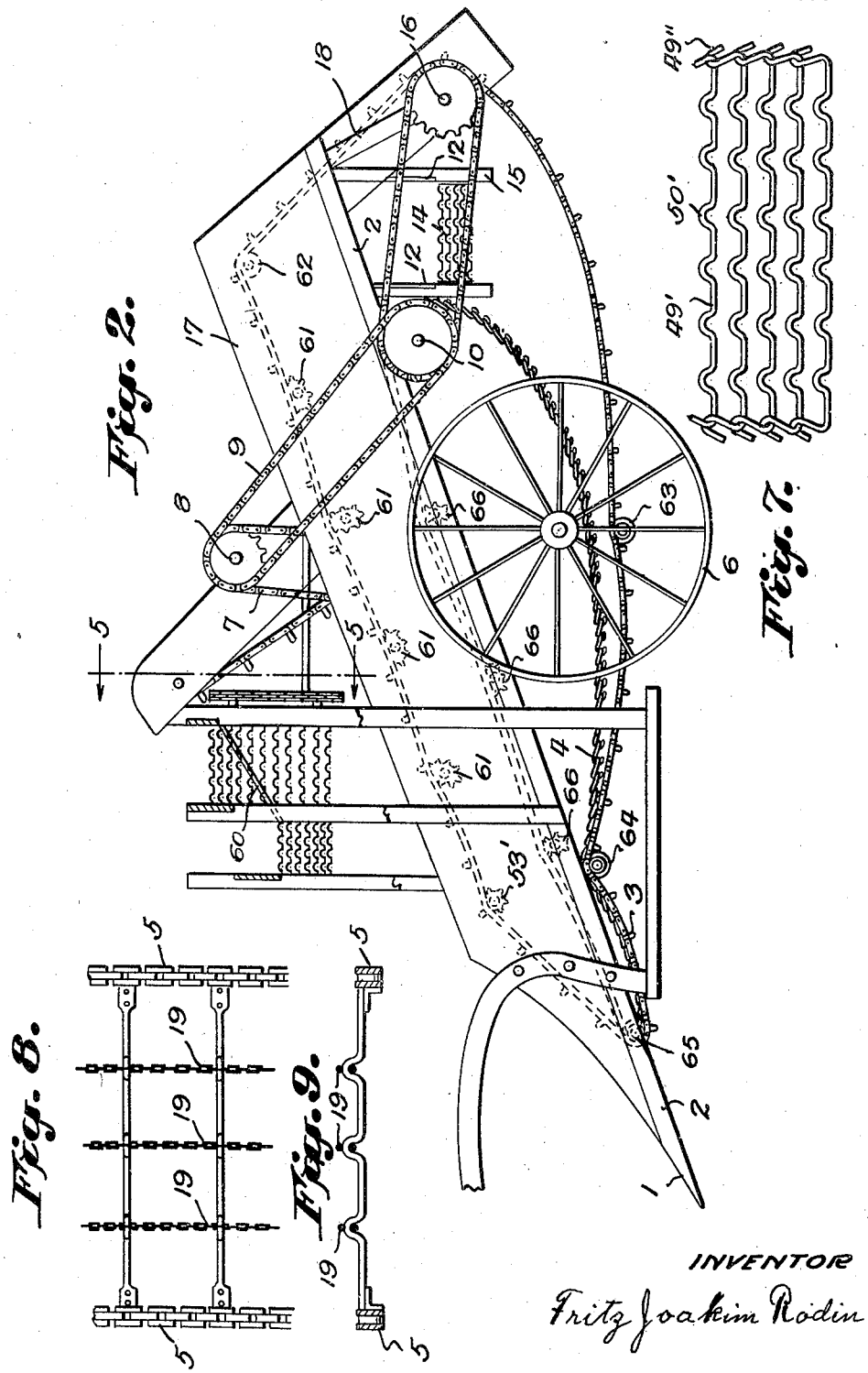
Fig. 2 is a side elevation looking to one side of the machine.

Said elevator consists of three parts, cross bar 3 secured to links 5 and three chains 19 fastened to cross bar 3 for the purpose of preventing the vines from falling through. This elevator travels over a sprocket 53' on shaft 53, agitators 61, rollers 63 and 64 and around roller 65; at this point, said elevator is resting on elevator 4 (see Fig. 2). This elevator 4 travels in the same direction and at the same speed and over agitators 66 around sprockets on shaft 10 over roller 64 and around roller 65. The purpose of this elevator is to remove the dirt and to convey the potatoes on to an elevator disposed at right angles in rear of machine. The elements 6 and 27 are the ground wheels and element 7 is a chain, said chain receiving power in the ordinary manner from the power take-off on the tractor which is not shown on the drawings and not part of invention.

The element 8 is a shaft receiving power from chain 7 and element 9 is a chain traveling around a sprocket on shaft 8 and on a sprocket on shaft 10. The chain 11 is traveling on a sprocket on shaft 10 and on a sprocket on shaft 16.

Figure 3:
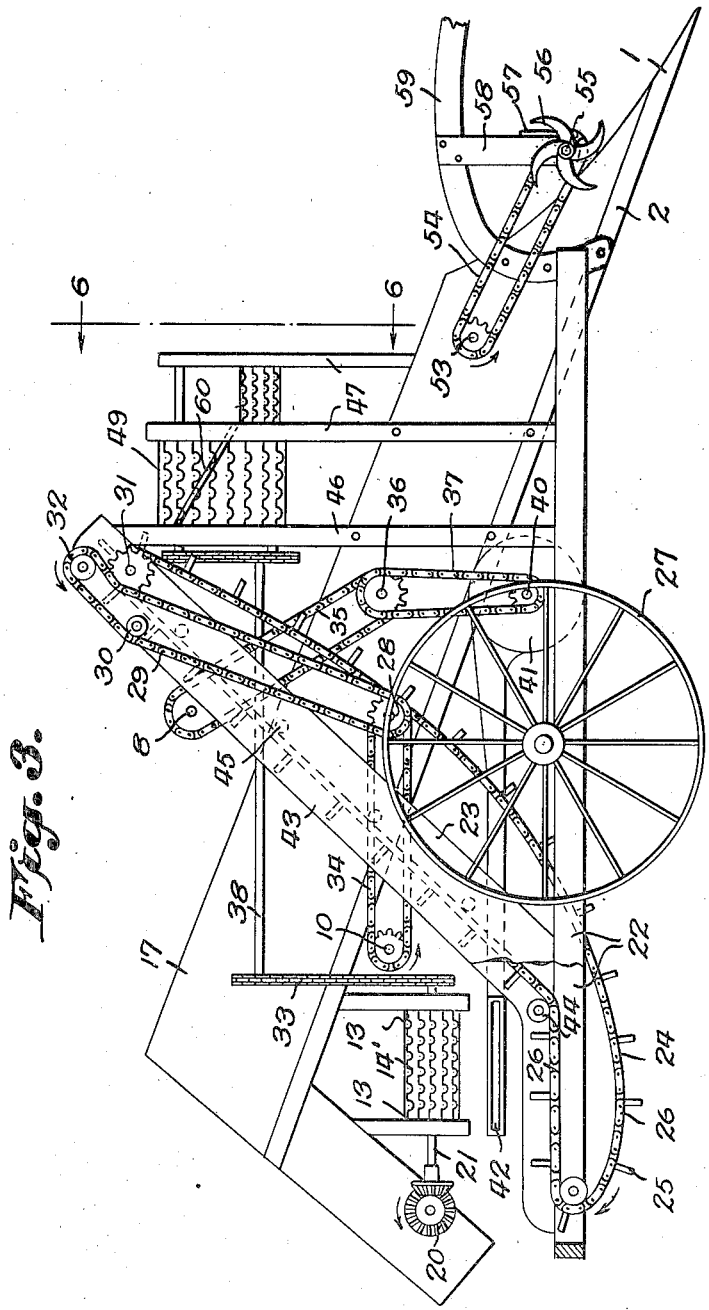
Fig. 3 is a view similar to Fig. 2 looking towards the other side of the machine.
Figure 4:
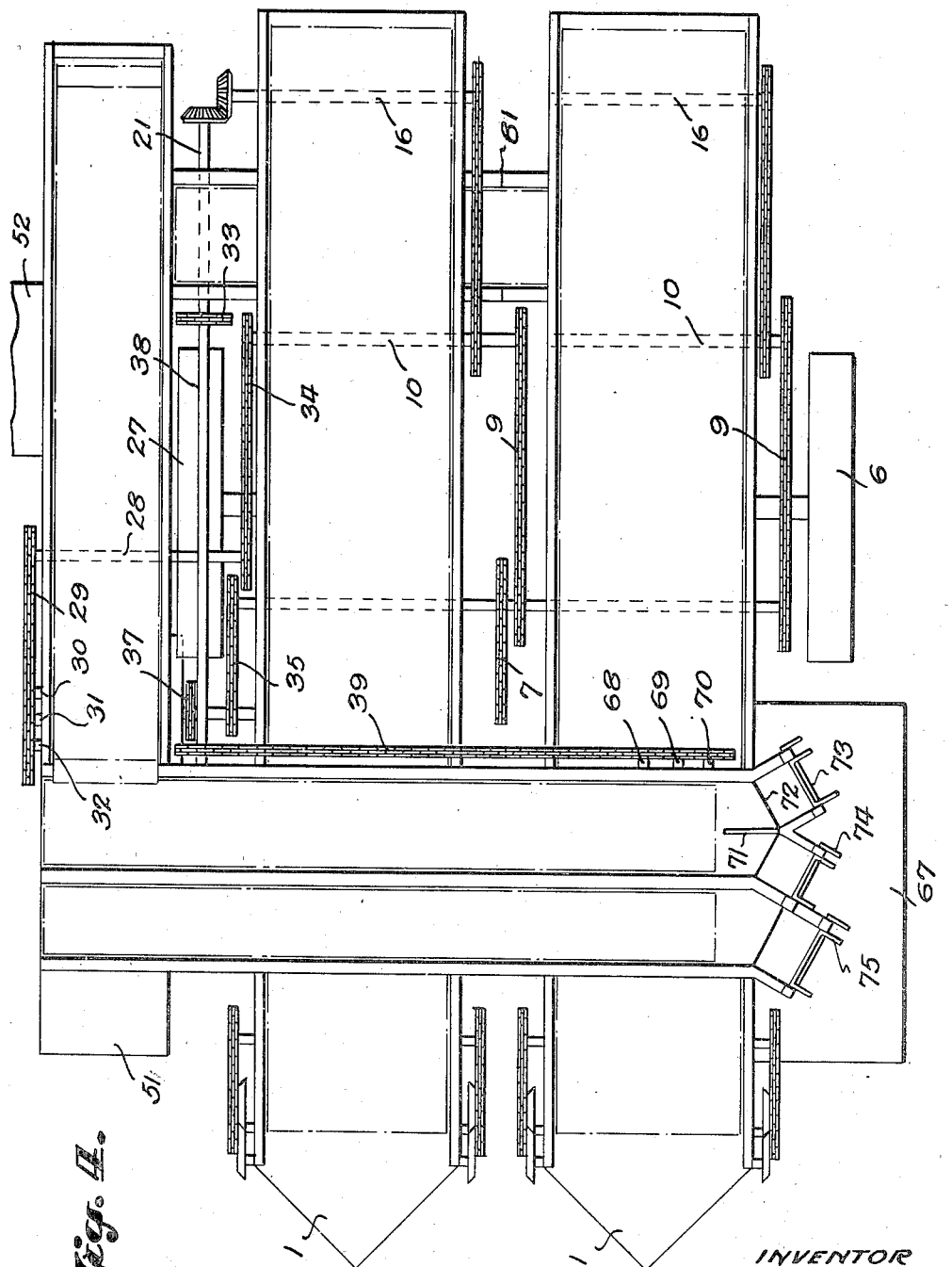
Fig. 4 is a view similar to Fig. 1 but is for a two-row machine.

The element 14 is an elevator disposed at right angles in rear of machine and includes spaced parallel side cheeks 12 supported by upstanding bars 15 secured to beam 2. Bars 18 are secured to beams 2, to support shaft 16. On said shaft is a bevel gear 20 for turning a like gear on shaft 21. On said shaft are two sprockets for turning elevator 14. Elevator 14 consists of two parts, a pair of chains 13, and an endless mesh belt 14' for receiving the potatoes and discharging them on to elevator 26 (see Fig. 3).

Elevator 14 is conventionally shown. For clearness of illustration, Figs. 1, 2, 3, 4, omit cheeks 43, rollers 44, chain 82 and its sprockets. Fig. 7 shows details of belts 49 and 50 on larger scale with rods 49' having hooks 49'' and partly round holes 50'. See further mention of these.

Element 22 consists of two beams arranged in parallel spaced relation secured underneath the axle. Secured to the beams 22 is a pair of upstanding bars 23, upper ends of said bars resting on support bars 46. Supported from the bars 23 are side cheeks 43. The elevator 14 discharges the potatoes upon the lower end of elevator 26, the latter includes the side cheeks 43 and a pair of endless chains 24 and an endless mesh belt 26 and a series of spaced carriers 25. The elevator travels over a sprocket on shaft 31 over rollers 45 and underneath the rollers 44. The spaced carriers fastened to the chain 24 stop at the inside of the chain to allow the chain 24 to pass underneath the rollers 44. The side cheeks 43 are over the top of said chains.

The element 34 is a chain traveling around a sprocket on shaft 10 and a sprocket on shaft 28. The chain 29 is travelling around a sprocket on shaft 28 over idler rollers 30 and 32 and traveling back over top on a sprocket on shaft 31 (see Fig. 3).

The element 35 is a chain traveling around a sprocket on shaft 8 and a sprocket on shaft 36. Chain 37 is traveling around a sprocket on shaft 36 and a sprocket on shaft 40. This is for turning blower 41. The air from the blower is discharged at point 42, as potatoes, grass, leaves and small parts of vines fall down from elevator 14, on to elevator 26. The air from the blower discharges the leaves, grass, etc., on to the ground on the other side. The potatoes will be carried by elevator 26 and be discharged on to belt 49.

Figure 5:
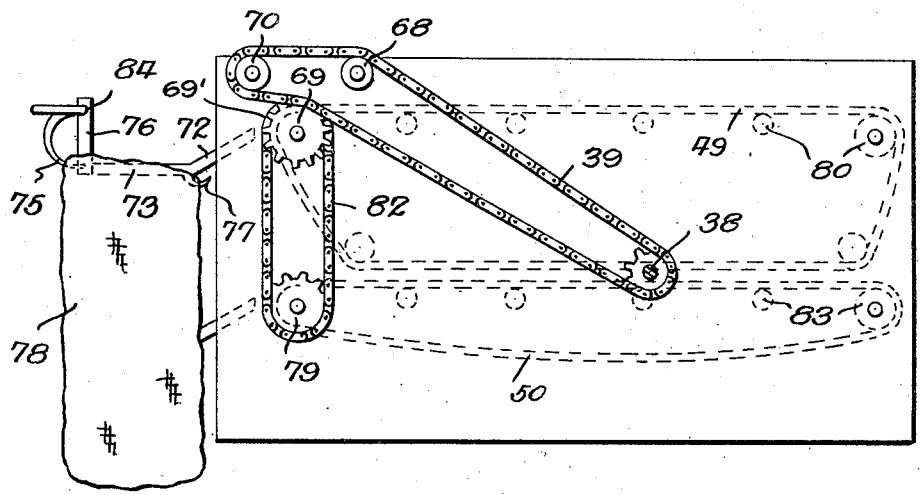
Fig. 5 is a detail in longitudinal section of the grader as seen from the rear of the machine.

The element 33 is a chain traveling around a sprocket on shaft 21 and sprocket on shaft 38. Chain 39 is traveling around a sprocket on shaft 38 and over idler rollers 68 and 70 and traveling back over top on a sprocket on shaft 69 (see Fig. 5). Chain 82 is traveling around a sprocket 69' on shaft 69 and a sprocket on shaft 79.

Figure 6:
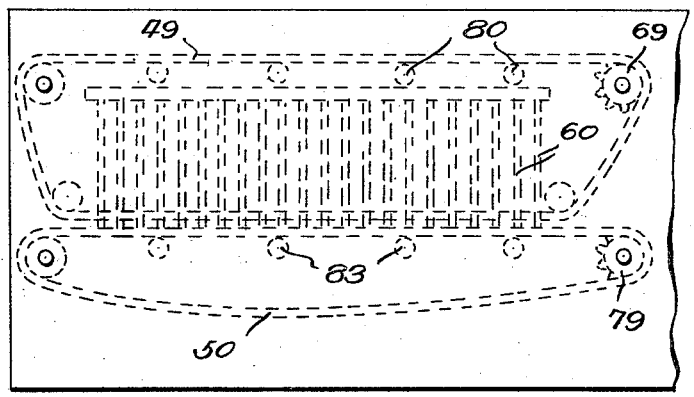
Fig. 6 is a view similar to Fig. 5 as seen from the front of the machine.

Elements 48 are side cheeks secured to upstanding supports 47. The potatoes fall from elevator 26 on to grading belt 49, said belt conveys the potatoes to chute 72 and into bags 78 (see Figs. 5 and 6). As the potatoes are conveyed on to the belt, the potatoes smaller than two inches drop through on to round bars 60 and roll down on to elevator 50. Said elevator conveys the potatoes to bags or similar containers.

The round bars 60 are spaced to 1½ inch openings to allow dirt and potatoes smaller than 1½ inches to fall through. The endless grading belt 49 is traveling over sprocket on shaft 69 and on idler rollers 80. The endless mesh belt 50 travels over a sprocket on shaft 79 and on idler rollers 83.

Element 73 is a bar bent in such a manner as to form a rectangular opening, each end secured to the grader and having one upstanding bar in each corner 76. Said bar has a hole at the top 84. Through this hole is a bar having one end bent to form a handle 74, on said bar are secured two hooks 75. When handle is turned down, the hooks go through the bag 78 into the front of the sackholder and when the handle is turned up the bag falls off and is transferred by hand to the ground or some vehicle used for carrying said containers of potatoes.

The hooks 77 secured to the chute 72 are for hanging the bags on to and when handle is let down the sack will stay in place.

The platforms 51 and 52 are for the purpose of people to stand upon while picking out potatoes and the like not marketable.

Platform 67 is for the purpose of having a person stand upon to remove a filled sack or container and put in position an empty container to be filled and for adjusting gate member 71 when required. The empty containers are piled upon the platform 67.

The two-row machine and elevator disposed at right angles to it have the side cheeks 12 cut into two parts at 81 (see Fig. 4) and arrangement is for the purpose of being able to lower or raise one digger at a time without interfering with the other digger.

A lever for lowering or raising is located at the front of each digger. This lever is not shown on the drawings and is not a part of the invention.

The element 53 (see Fig. 3) is a shaft having a sprocket on each side of cheek 17. The chain 54 is traveling around a sprocket on shaft 53 and sprocket on shaft 55. On said shaft are four rotating knives 56. An upstanding bar 58 is secured to beams 59 and a plate of steel 57 is secured to bar 58. The purposes of the knives are for picking up vines and weeds and to convey same upwardly to be cut off at steel plate 57.

What I claim is:—

1. A means in a potato harvester machine for grading potatoes into two different grades and for conveying the potatoes to a chute and sackholder and into containers and for a grading belt consisting of long links of round bars bent in spaced places in a way so as to form partly round holes after links are hooked together.

2. In a potato harvester and grader, in combination: a plow; an agitated devining elevator leading immediately from the plow; a first potato elevator having agitating means and surrounded by said devining elevator; a second potato elevator at right angles to and receiving from the first one, its receiving end surrounded by said devining elevator; a third potato elevator at right angles to and receiving from the second one; a blower discharging between the delivery end of the second, and the receiving end of the third, potato elevators; a first grading belt at right angles to and receiving from the third potato elevator; a sackholder at the delivery end of said first grading belt; a chute whose receiving end is surrounded by said first grading belt; a second grading belt at right angles to, and receiving from, said chute, and parallel to said first grading belt; a sackholder at the delivery end of said second grading belt.

3. The subcombination in a potato harvester provided with digging and conveying means, of a sackholder provided with a rectangular opening bounded by a bar bent in two places with its ends attached to the delivery end of the conveying means and such bends remote therefrom, an upstanding bar adjacent each of said bends, such upstanding bars having alined holes receiving a fourth bar, one end of said fourth bar bent to form a handle, the middle portion of said fourth bar provided with bag-holding hooks.

4. In a potato harvester provided with a digger, a hanger at each side of the digger, a horizontal shaft rotatable in said hanger, said shaft provided with curved blades, a vertical metal plate on each hanger, above the shaft for contacting each blade with a shearing action, and means for rotating said shaft in a direction to gather vines and weeds and carry the same into contact with said vertical plate.

FRITZ JOAKIM RODIN.